UNITED STATES PATENT OFFICE.

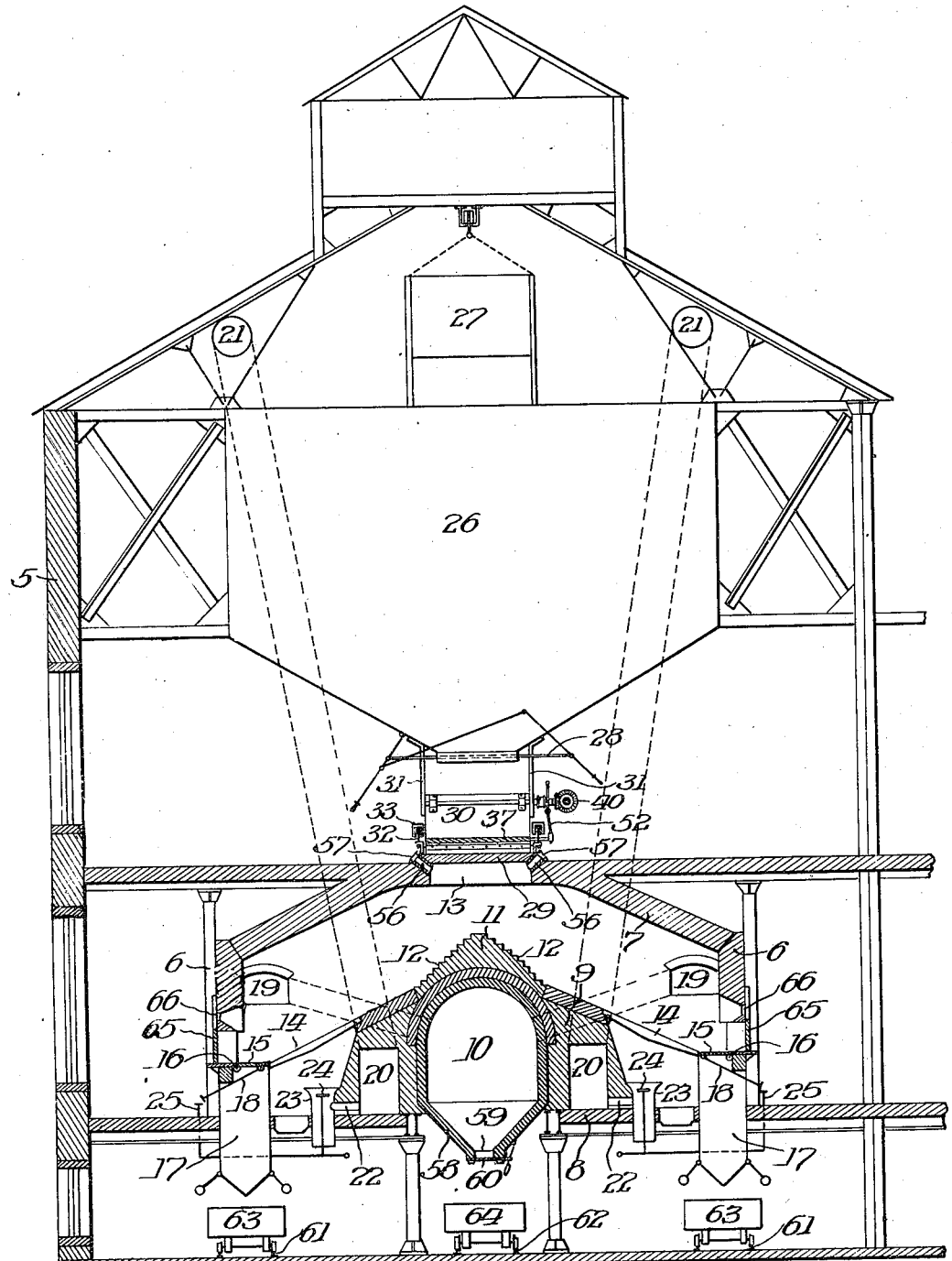

WALTER B. WRIGHT, OF CHICAGO, ILLINOIS.

INCINERATING-FURNACE.

1,204,530.  Specification of Letters Patent.  Patented Nov. 14, 1916.

Original application filed September 6, 1912, Serial No. 718,846. Divided and this application filed May 7, 1914. Serial No. 836,888.

*To all whom it may concern:*

Be it known that I, WALTER B. WRIGHT, a citizen of the United States, residing at Chicago, in the county of Cook, State of Illinois, have invented certain new and useful Improvements in Incinerating-Furnaces, of which the following is a full, clear, and exact description, such as will enable others skilled in the art to which the invention appertains to make and use the same, reference being had to the accompanying drawing, and to the figures of reference marked thereon, which forms a part of this specification.

My present invention relates to an incinerating furnace of the general type disclosed in my former Patent No. 575,088, granted January 12, 1897, and effects several substantial improvements therein.

Among the leading objects sought and attained by the invention are, to provide an improved structure facilitating the poking and distribution of the furnace charge; to provide a structure automatically serving to rid the building in which the furnace is located of objectionable odors and gases; to provide an improved means for withdrawing and disposing of the clinker and ash; to provide means for collecting and withdrawing dust and other fine solid matter from the gases of combustion before they reach the chimney; and to effect an economy of operation through the utilization of what would otherwise be waste heat to heat up, in a novel manner, the incoming air that supports combustion.

With these and other minor objects of improvement in view, my invention consists in the improved incinerating-furnace structure substantially as hereinafter described and defined, as to its novel features, in the appended claims.

A practical embodiment of my invention is illustrated in the accompanying drawing, wherein the figure is a vertical longitudinal section through a double-end or twin furnace structure embodying my improvements, the figure also showing, mainly diagrammatically, an inclosing housing containing, in its upper portion above the furnace proper, a storage bin and conveyer.

Referring to the drawing, 5 designates as an entirety an inclosing structure or housing within which the furnace, storage bin, and feed devices are all located, such outer structure in practice usually housing a row or battery of identical furnaces located side by side. The furnace proper, like that shown in my former patent referred to, is of a double-end type, designed to accommodate separate fires at each end, with a single, central feed-opening in the roof or dome of the structure, through which the matter to be burned is supplied to both fires.

6 designates the end walls, 7 the roof or dome, and 8 the floor or base wall of the furnace structure proper. On the base 8, centrally between the end walls 6, is erected a masonry structure designated as an entirety by 9, through the central portion of which is formed a large flue 10, through which the smoke and other gaseous products of combustion pass to the chimney (not shown). Directly above the flue 10 is an elevated ridge 11 formed with sloping serrated walls 12 forming drying hearths, on which the garbage or other material to be incinerated is deposited through a feed opening 13 located centrally of the roof 7. Below the sloping walls 12 are inclined grate-bars 14, and opposite the lower ends of the latter are located horizontal clinker-doors 15 that are hinged at 16 directly over vertically disposed clinker-pockets 17, and are raised and lowered by suitably mounted operating rods 18.

The space bounded by the dome 7, end walls 6, grates 14 and sloping walls 12, constitutes the incinerating chamber of the furnace; and formed within the side walls of said chamber, and opening into the latter adjacent to the end walls 6, are flues 19 that communicate at their other ends with the upper portion of the main central smoke flue 10, and serve to conduct the smoke and gases of combustion from the incinerating chamber into said main flue.

The furnace herein shown is designated as a high-temperature incinerator requiring no fuel other than the stock to be burned and operating under a forced draft. Formed in the side walls of the central structure 9 and lying alongside and parallel with the main exhaust flue 10 are a pair of hot-air intake ducts 20 that are, in practice, preferably connected at one end with a pair of air intake pipes 21 located directly beneath the roof of the superstructure or housing 5; the purpose of this being to cause an induced draft from within the building itself, whereby objectionable odors and gases within said building and in the vicinity of the storage bin are drawn into the furnace, rather than allowed to escape from the building itself. The incoming air flowing through the ducts 20 becomes highly heated by reason of the hot condition of the walls of said ducts, which, it will be noted, lie between the fire-grates on the one side and the central discharge flue 10 on the other. Said heated air passes through lateral ducts 22 into vertical blower-casings 23 mounted in the floor of the furnace directly beneath the grates 14. The blower-casings 23 are equipped with annular steam jet blowers, indicated at 24, whereby a powerful induced draft of steam and air is created directly beneath the fire-grates.

At 25 are conventionally indicated means within ready reach of the tender of the furnace for controlling the operation of the blowers 24.

In the upper portion of the main housing, directly above the furnace, is located a large capacity storage-bin, diagrammatically indicated at 26, that is supplied with material to be burned by a conveyer conventionally shown at 27, and is equipped with a sliding delivery gate 28 in its bottom for discharge of the material in substantially uniform quantities into the directly underlying feed mechanism of the furnace. This feed mechanism, which forms the subject matter of an application for Letters Patent filed by me on the 6th day of September, 1912, Serial No. 718,846, and of which application this present application is a division, comprises, essentially, a pair of door-sections, one of which is shown in cross section at 29, movable toward and from each other and guarding the feed-opening 13, a superposed feed-hopper 30 suspended from the storage bin 26 by hanger brackets 31, a pair of hopper-bottom sections 37 rigidly mounted on the door-sections 29, supporting means for said door and hopper-bottom sections, comprising trolleys 32 and trolley-tracks 33, and power operating mechanism, indicated at 40, controlled by a clutch lever 52.

At the opposite sides of the feed-opening 13 which lie substantially in the same planes with the sloping sides of the ridge 11 are located poke-holes 56, normally closed by hinged lids 57, by opening which latter and inserting iron rods or pokers, each charge, after it has lain on one of the sloping sides of the ridge 11 long enough to become sufficiently dried out to readily burn, may be poked down onto the grate 14, where it is thoroughly incinerated, thus leaving the ridge 11 ready for the next charge.

The central flue 10, especially where serving a sizable battery of furnaces arranged side by side, collects a considerable amount of dust, fine cinders, and small particles of incombustible matter from the material burned, and constitutes, in effect, a dust chamber, which requires occasional cleaning out to maintain its efficiency. By my present invention I provide a simple and convenient means for collecting and disposing of this dust that accumulates in the flue or chamber 10, the same consisting of a shallow hopper or dust-pocket 58 that forms the bottom of each section of the flue 10 pertaining to each furnace. This pocket has four sloping side walls and a delivery opening 59 controlled by a manually-operated slide-valve 60.

In the basement of the furnace house, below the furnace room proper, are preferably located tracks 61 and 62, the former beneath the clinker-pockets 17, and the latter beneath the dust-pockets 58. On these tracks travel clinker and dust cars 63 and 64, respectively, by which the clinker and dust pockets are conveniently served in an obvious manner.

The side walls 6 of the furnace are equipped, directly opposite the clinker-doors 15, with sliding doors 65, by raising which, the fires may be poked from the outside, when necessary, and the clinker accumulated on the fire-grates 14 may be drawn down into the pockets 17, the doors 15 being then open. The main function of the doors 15 is to catch and retain matter that may roll down over the fire-grates 14 and would otherwise enter the clinker pockets without being consumed. The clinker pockets 17 are internal pockets, and thus obviate the presence in the furnace house of the acrid fumes given off by the hot clinker where the latter is raked out of the furnace, and also obviate the cooling down of the fire caused by the opening of a door of sufficient size to permit the clinker to be drawn out.

I claim:

1. In an incinerating furnace, the combination with the furnace chamber having a feed opening in its roof, of a closure for said feed opening, a drying hearth beneath said opening formed with a sloping side on which the material introduced is adapted to lodge, a stationary fire grate section opposite the lower end of said sloping side, a clinker door opposite and substantially in the horizontal plane of the outer end of said stationary fire grate section and within the furnace chamber adapted to catch unconsumed matter overflowing said fire grate section and hold it until consumed, a clinker pocket beneath said clinker door, and means for opening said clinker door.

2. In an incinerating furnace, the combination with the furnace chamber having a feed opening in its roof, of a closure for said opening, a drying hearth beneath said opening formed with a sloping side on which the material introduced is adapted to lodge, a stationary inclined fire grate section opposite the lower end of said sloping side, a horizontally hinged clinker door opposite and substantially in the horizontal plane of the lower end of said inclined fire grate section and within the furnace chamber adapted to catch unconsumed matter overflowing said fire grate section and hold it until consumed, a door in the furnace wall opposite said clinker door serving to permit poking of the fire from outside the furnace chamber, a clinker pocket beneath said clinker door, and means extending through the wall of the furnace for opening said clinker door.

3. In an incinerating furnace, the combination with the containing walls of the furnace, and a basement chamber beneath the furnace floor, of an inclined fire grate within the furnace chamber, a clinker pocket located opposite and beneath the lower end of said fire grate and extending through the furnace floor and into said basement chamber, a normally closed door on the upper end of said clinker pocket, door-operating means extending to a point outside the furnace, automatically closing valves on the lower end of said clinker pocket adapted to be opened by the weight of the clinker, and a delivery car adapted to travel in said basement chamber beneath the lower end of said clinker pocket.

4. In a double-end incinerating furnace of the character specified, the combination with the containing walls of the furnace, and a basement chamber beneath the furnace floor, of fire-grates located at opposite ends of the furnace chamber, a central discharge flue extending crosswise of said furnace chamber, branch flues connecting the opposite ends of said furnace chamber with said central flue, a dust pocket formed with sloping walls beneath and in open communication with said central discharge flue and extending through the furnace floor and into said basement chamber and provided with a valve-controlled discharge-opening in its lower end, and a delivery car adapted to travel beneath the lower end of said dust pocket.

5. In a double-end incinerating furnace of the character specified, the combination with the containing walls of the furnace, and a basement chamber beneath the furnace floor, of inclined fire-grates located at opposite ends of the furnace chamber, clinker pockets beneath the lower ends of said fire-grates and extending through the furnace floor and into said basement chamber, said clinker pockets having openable bottoms, a central discharge flue extending crosswise of said furnace chamber between said fire-grates, branch flues connecting the opposite ends of said furnace chamber with said central flue, a dust pocket formed with sloping walls beneath and in open communication with said central discharge flue and extending through the furnace floor and into said basement chamber and provided with a valve-controlled discharge-opening in its lower end, and delivery cars adapted to travel beneath the lower ends of said clinker pockets and said dust pocket.

WALTER B. WRIGHT.

Witnesses:
S. N. POND,
A. G. LATIMER.